(No Model.)
J. CHRISTENSEN.
BICYCLE BRAKE.
No. 543,724.  Patented July 30, 1895.
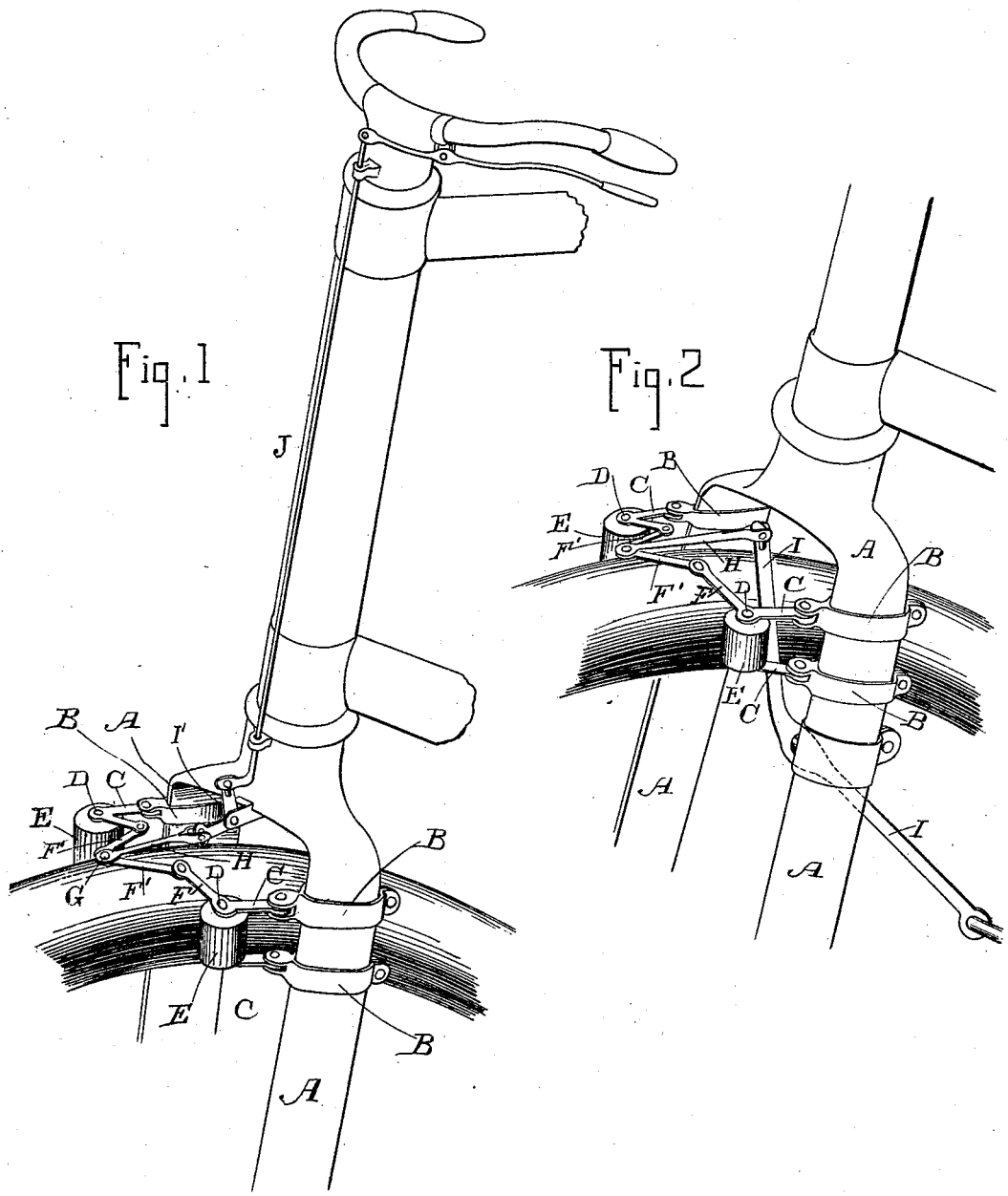
Witnesses,
J. Tromse
M. B. Smith
Inventor,
Jorgen Christensen
By Dewey & Co.
attys

UNITED STATES PATENT OFFICE.

JORGEN CHRISTENSEN, OF SAN FRANCISCO, CALIFORNIA.

BICYCLE-BRAKE.

SPECIFICATION forming part of Letters Patent No. 543,724, dated July 30, 1895.

Application filed March 7, 1895. Serial No. 540,925. (No model.)

*To all whom it may concern:*

Be it known that I, JORGEN CHRISTENSEN, a citizen of the United States, residing in the city and county of San Francisco, State of California, have invented an Improvement in Bicycle-Brakes; and I hereby declare the following to be a full, clear, and exact description of the same.

My invention relates to certain improvements in brakes for bicycles.

It consists in certain details of construction, which will be more fully explained by reference to the accompanying drawings, in which—

Figure 1 is a view of my brake with a hand-lever attachment. Fig. 2 shows it as operated by a foot-lever.

The object of my invention is to provide a brake which is especially adapted to be used upon two-wheeled bicycles having pneumatic or other tires, so that a sufficient pressure may be applied to check the speed of the machine without undue wear upon the tires themselves.

In the present case I have shown the device as applied to the front forks A of a bicycle, so that the brake may be applied directly to the rim or tire thereof; but it will be manifest that the device may also be applied to the rear wheel if found desirable.

B B are clamps fixed upon each of the forks of the bicycle, one above the other, as shown, separated a short distance from each other and having lugs, to which are pivoted rocking arms C. Between the outer ends of each pair of these arms is a shaft D, and upon each of these shafts is loosely journaled a roller E. These rollers may be made of rubber, gutta-percha, or other suitable or desired material, either smooth or corrugated, and are adapted to revolve loosely upon the shafts when their peripheries are brought into contact with the wheel rim or tire.

The position of the clamps B and the rollers E is such that the rollers will be supported upon each side of the wheel rim or tire at a point near the upper part when applied to the front forks, and at any other suitable point in the circumference if applied to the rear forks of the machine.

Connected with the upper ends of the shafts D or forming bell-crank combinations of the arms C are lever-arms F, which converge, as shown, and may be connected together with movable joints at their meeting ends, or, as shown in the present case, they are connected with lever-arms F', which are in turn united by a pivot-pin at G. From this pivot-pin a rod or link H extends toward the fork-crown, where it is connected with an actuating-lever I'.

This brake mechanism may be actuated by either foot or hand power. When it is operated by foot-power the lever I is suitably fulcrumed within the fork and extends down by the side of one of the forks, having its lower end so formed that the foot of the rider may be applied to the lever, forcing the lower end forward and correspondingly drawing the upper end inwardly. This action draws upon the connecting rod or link H and through the arms F F' causes the arms C, which are fulcrumed to the clamps B, to turn about their fulcrum-pins, and the rollers E are thus drawn forcibly against opposite sides of the rim or tire of the wheel, so as to bring any desired amount of pressure upon it and a sufficient rolling friction to check the motion of the wheel to any desired degree.

If it is desired to operate the brake by hand-power, the connection of the link H is made in the same manner to a lever I', which is, in this case, in the form of a bell-crank lever, having its angle fulcrumed to the fork-crown, as shown, and one arm of the lever being connected with the rod or link H. The other arm is connected by a slidable bar J with the hand-lever, which is fulcrumed upon the handle-bars in the usual manner, so that by pressing upon this handle-bar the connecting-rod J is forced down, and, acting through the bell-crank lever I', moves the compound levers F and F' and the arm C, which supports the roller-shafts, as previously described, so as to press the rollers against the rim or tire of the wheel. As soon as pressure upon the lever is relieved in either case, the lever is thrown back by a spring and the rollers are forced outward away from the rim or tire.

Having thus described my invention, what I claim as new, and desire to secure by Letters Patent, is—

1. A bicycle brake consisting of rollers, shafts upon which they are loosely journaled upon opposite sides of the vehicle wheel, lever arms to which the upper and lower ends of the shafts are fixed, said arms being pivoted to and turnable about fixed supports so that the rollers may be made to approach to or separate from each other, lever arms converging toward each other from the arms which carry the rollers, and a connecting link by which said converging levers are united, with an operating lever whereby the rollers may be caused to approach and press upon the wheel rim or separate from each other to release it.

2. In a bicycle brake, clamps fixed upon the framework or forks upon opposite sides of the wheel, lever arms fulcrumed to said clamps and having shafts fixed between their outer ends, rollers loosely turnable upon said shafts between the levers upon opposite sides of the wheel rim or tire, lever arms F F' extending inwardly from the levers which carry the roller shafts, a link connected with the meeting ends of said lever arms and uniting them with an operating hand or foot lever, substantially as herein described.

In witness whereof I have hereunto set my hand.

JORGEN CHRISTENSEN.

Witnesses:
S. H. NOURSE,
JESSIE C. BRODIE.